United States Patent

Miyamoto et al.

[11] Patent Number: 5,896,234
[45] Date of Patent: Apr. 20, 1999

[54] LENS BARREL

[75] Inventors: Hidenori Miyamoto, Urayasu; Hiroshi Wakabayashi, Yokohama, both of Japan

[73] Assignee: Nikon Corporation, Tokyo, Japan

[21] Appl. No.: 08/864,948

[22] Filed: May 29, 1997

[30] Foreign Application Priority Data

May 30, 1996 [JP] Japan .................... 8-136390

[51] Int. Cl.$^6$ .................................. G02B 7/02
[52] U.S. Cl. ................. 359/819; 359/811; 359/822
[58] Field of Search ........................ 359/811, 819, 359/820, 645, 646, 822

[56] References Cited

U.S. PATENT DOCUMENTS 4,961,627 10/1990 Swain et al. .................... 359/819
5,506,731 4/1996 Smiley ............................ 359/822
5,600,495 2/1997 Sekikawa ........................ 359/819
5,694,257 12/1997 Amone et al. .................. 359/822

*Primary Examiner*—Loha Ben
*Attorney, Agent, or Firm*—Morgan, Lewis & Bockius LLP

[57] ABSTRACT

Disclosed is a lens barrel capable of restraining an error of an inter-lens spacing accuracy in a lens frame down to several μm or under. The lens barrel has a plurality of lenses, and a lens frame for holding these lenses at predetermined intervals to make optical axes of the lenses coincident. Provided are at least three steel balls contiguous to lens surfaces, facing to each other, of the two lenses among those lenses. The three steel balls are disposed so that the centers of the steel balls are positioned on the same circumference about the lens optical axis. The steel balls are in contact with substantially trisected portions along an inner peripheral surface having an inside diametrical dimension smaller than a maximum inside diameter portion formed in the lens frame. The lens frame is provided with wall portions for regulating motions of the steel balls in the circumferential and radial directions.

7 Claims, 4 Drawing Sheets

LENS BARREL

This Application claims the benefit of Japanese Application No. 8-136390 which is hereby incorporated by reference.

BACKGROUND OF THE INVENTION

1. Field of the Invention

The present invention relates generally to a lens barrel of a camera or an interchangeable lens detachably attached to the camera and, more particularly, to a lens fixing structure in the lens barrel, which is used for fixing and holding a plurality of lens elements to a lens frame.

2. Related Background Art

A lens barrel incorporates a single or a plurality of lens units as a photographing optical system. It has hitherto been practiced that a lens assembly body is assembled by the plurality of lens elements constituting the above lens unit and a lens frame incorporating and holding these lens elements.

As a method of incorporating, fixing and thus holding the plurality of lens elements of the lens unit at a predetermined interval into the lens frame in the lens barrel described above, there is known a first method of, as illustrated in FIG. 5, incorporating the lens elements into the lens frame from one direction, and interposing a spacing ring pre-worked to have a predetermined thickness enough to secure a predetermined spacing between the lens elements.

More specifically, referring to FIG. 5, a lens assembly body 1 is so disposed as to be movable or fixed in an unillustrated lens barrel and constitutes lens units of a photographing optical system. The lens assembly body 1 includes a lens frame 2, and two lenses 3, 4 incorporated into this lens frame 2.

Herein, FIG. 5 illustrates a case where the two lenses are sequentially incorporated into the lens frame 2 from one side. A space ring 5 is interposed between these lenses 3, 4, and a stop ring 6 is screwed through a screw portion 6a to an incorporating-side aperture edge of the lens frame 2, thus fixing the whole. Note that an inside diameter flange portion designated by 2a in FIG. 5 is formed along a non-incorporating-side aperture edge of the lens frame 2.

There is known also a second method of securing the spacing between the lenses 3, 4 owing to a thickness of a flange wall 7 by providing, as shown in FIG. 6, this flange wall 7 having a predetermined thickness at the center of the lens frame 2 in the optical-axis direction, and incorporating and fixing the lenses 3, 4 on both sides of this wall 7.

Herein, a stop ring indicated by the numeral 8 in FIG. 6 has a screw portion 8a through which the stop ring 8 is screwed to the incorporating-side aperture edge of the lens 3 to fix the lens 3 incorporated into the lens frame 2.

In the lens assembly body 1 used for the prior art lens barrel described above, however, when fixedly holding the lenses 3, 4 in the lens frame 2 by the first method, a gap must be needed between the space ring 5 and an inner peripheral wall of the lens frame 2. Therefore, if the space ring 5 gets eccentric, the problem arises in which a contact point to the lens 4 is inclined enough to let the lens 4 down. Further, if an accuracy of a thick dimension of the space ring 5 falls within an allowable error range on the order of, e.g., several tens μm, the working of the space ring 5 is easy. If the accuracy as precise as several μm is required, however, there might arise a problem in which the working method is difficult, and the costs increase.

Moreover, if the lens frame 2 is molded into a resinous molding by the second method described above, it is highly difficult to secure an accuracy of the thick dimension of the flange wall 7 to determine the spacing between the lenses 3, 4.

That is, a molding die for molding the lens frame 2 is, as shown in FIG. 7, constructed of a pair of dies 9A, 9B, and a cavity (indicated by 2A in FIG. 7) for forming the lens frame 2 is formed between these dies 9A, 9B. There must be, however, a difference between the die 9A for forming one chamber with the flange wall 7, interposed therebetween, for keeping the spacing between the lenses 3, 4 with a predetermined thick dimension, and the die 9B for forming the other chamber. Consequently, an error in thickness of the wall 7 is twice as large as an error in working of the dies 9A, 9B. Further, there must be a differences between dies for forming a contact points of the lens 3, an inside diameter portion 7d, a contact point 7a of the lens 4, and an inside diameter portion 7c, and hence a deviation is produced in the direction perpendicular to the optical axis when matching the dies enough to cause eccentricity, resulting in a discrepancy in the optical axes of the lenses 3, 4.

Accordingly, according to these prior art methods, it is extremely difficult to keep the error in the spacing accuracy between the lenses 3, 4 within an error range on the order of several μm even when using the space ring 5 or the flange wall 7. It has been desired to take some measures capable of obviating the problem in terms of the accuracy.

SUMMARY OF THE INVENTION

It is a primary object of the present invention, which was contrived under such circumstances, to provide a lens barrel capable of restraining a manufacturing error range of a spacing accuracy between lenses held in a lens frame down to several μm or under with a simple structure.

To accomplish the above object, a lens barrel according to the present invention comprises a plurality of lenses, a lens holding member for holding the lenses at predetermined intervals so as to make optical axes of the lenses coincident with each other, and spherical members disposed between at least the two lenses among the lenses and in contact with lens surfaces, facing to each other, of the two lenses.

Herein, the spherical member may be preferably a steel ball. At least three pieces of the spherical members may be used. Further, such three spherical members may be disposed so that the centers of the spherical members are positioned on the same circumference about the optical axis of the lens. Moreover, the spherical members may be so provided as to be in contact with substantially trisected portions along the inner peripheral surface having an inside diametrical dimension smaller than a maximum inside diameter portion formed in the holding member. Further, a holding portion for regulating motions of the spherical member in the peripheral and radial directions, may be provided in a part of the holding member.

According to the present invention, at least three steel balls are employed as parts corresponding to the conventional space ring for holding the lenses at the predetermined spacing within the lens frame. Besides, these steel balls are disposed in the substantially trisected positions in the peripheral direction of the lens, whereby the assembly can be made by setting the lens spacing to a predetermined value with the diametrical dimension of the steel ball. An outside diametrical dimension of the generally commercially available steel ball may have a scatter on the order of several μm and is also easy to get. It is therefore possible to easily set the error of accuracy of the lens spacing within several μm, and to assembly the photographing optical system in the predetermined state by using the lens units in the lens barrel.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
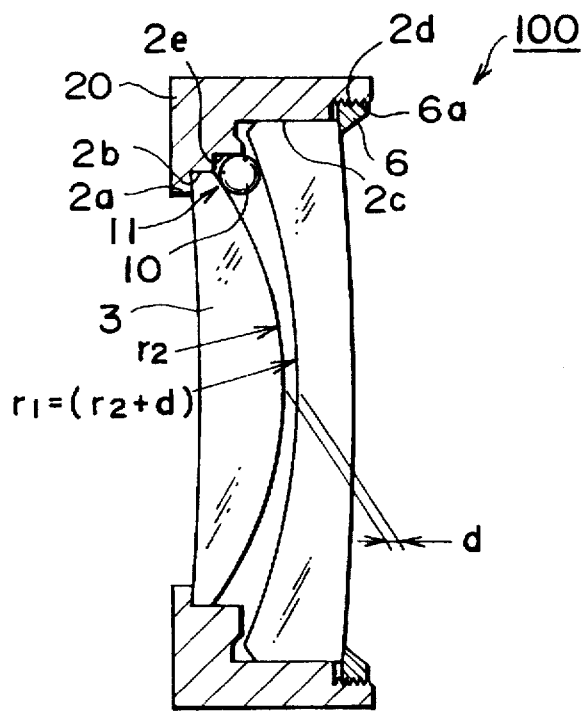
FIG. 1 is a sectional view showing the principal portion of a lens assembly body in one embodiment of a lens barrel according to the present invention.
Figure 2:
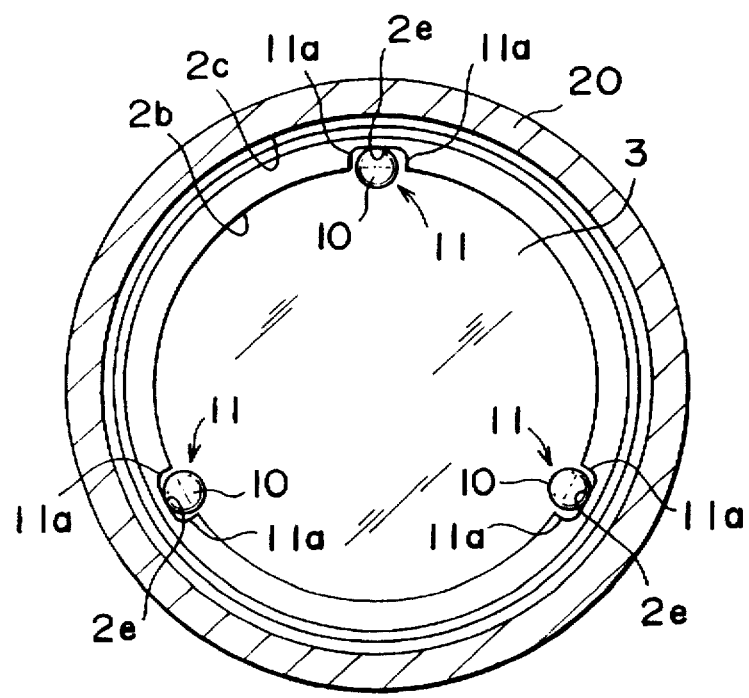
FIG. 2 is an explanatory sectional view showing portions where steel balls are incorporated in the lens assembly body in FIG. 1.
Figure 6:
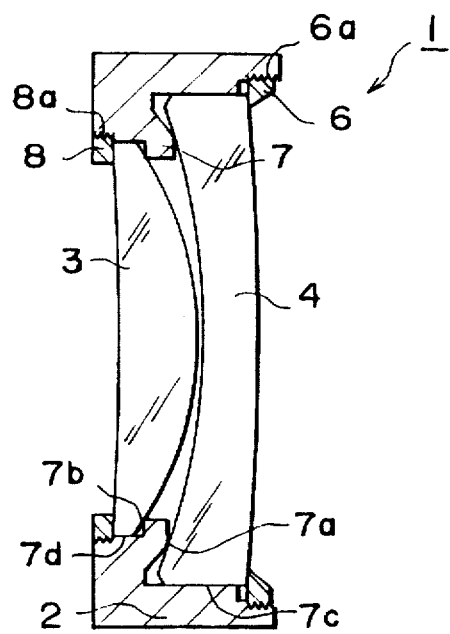
FIG. 6 is a sectional view showing the principal portion by way of another example of the lens assembly body in the prior art lens barrel.
Figure 7:
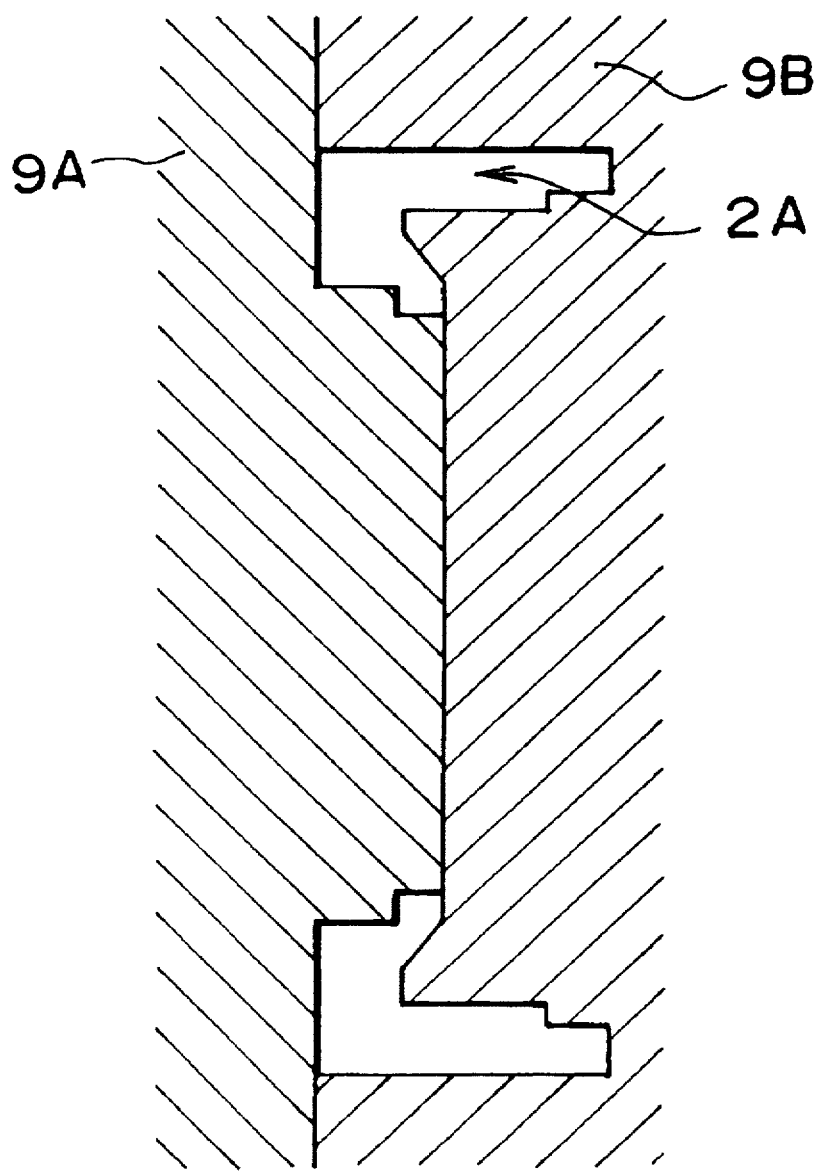
FIG. 7 is an explanatory view showing a structure of a molding die for molding the lens frame of the lens assembly body in FIG. 6.

FIGS. 1 and 2 illustrate one embodiment of a lens barrel according to the present invention. Throughout FIGS. 1 and 2, the same or corresponding components to those in FIGS. 5 to 7 are marked with the like numerals, and explanations thereof are omitted.

Figure 5:
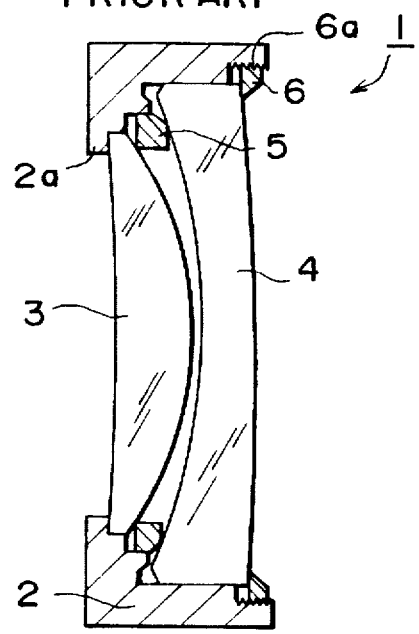
FIG. 5 is a sectional view showing the principal portion by way of one example of a lens assembly body in a prior art lens barrel.

A lens frame 20 constituting a lens assembly body 100 in this embodiment has, as in the example of the prior art shown in FIG. 5, such a structure as to incorporate two lenses 3, 4 from one side (the right side in FIG. 1) of the lens frame 20. The lens frame 20 is formed with an inside diameter portion 2b accommodating the lens 3 having a smaller diameter, and an inside diameter portion 2c accommodating the lens 4 having a larger diameter. An inside diameter flange portion 2a for securing the lens 3 is formed along a non-incorporating-side aperture edge of the inside diameter portion 2b having the smaller diameter. A thread portion 2d mating with a screw portion 6a of a stop ring 6, is formed along an incorporating-side aperture edge of the inside diameter portion 2c having the larger diameter.

With respect to face-to-face lens curved surfaces of the lenses 3, 4 described above, a curvature radius r1 of a curved surface of the lens 4 having the larger diameter exceeds a value obtained by adding a spacing d to a curvature radius r2 of the curved surface of the lens 3 having the smaller diameter on the optical axis of the lens.

A steel ball 10 is disposed in such a state as to be in contact with the curved surfaces of the lenses 3, 4 for the purpose of determining the spacing between the two lenses 3, 4. The spacing between the face-to-face curved surfaces of these lenses 3, 4 becomes narrower as it gets closer to the lens optical axis from a relationship between the curvature radiuses r2 and r1. Therefore, the steel ball 10 is so interposed between the two lenses 3, 4 as to be held in the optical-axis direction by the curved surfaces of the lenses 3, 4, and moved in such a direction as to get away from the optical axis. Then, the steel ball 10 contacts with an inner peripheral surface 2e of the lens frame 20, and this state is kept.

In this embodiment, as illustrated in FIG. 2, three pieces of steel balls 10 are disposed in a recessed portions 11 provided in positions at intervals of 120°, wherein peripheral edges of the lenses 3, 4 are substantially trisected in the peripheral direction. The recessed portions 11 are formed in three positions in the peripheral direction of the inside diameter portion 2b of the lens frame 20 holding the lens 3 having the smaller diameter. The three steel balls 10 are disposed in such a state as to be partly fitted in the recessed portions 11. These steel balls 10 are set in a state where the balls 10 are in contact with the inner peripheral surface 2e smaller than the maximum inside diameter portion 2c holding the lens 4 in the lens frame 2 by the bottom portions of those recessed portions 11, whereby the centers of the steel balls 10 are positioned on the same circumference about the lens optical axis. In particular, the inside diameter portions 2b, 2c and the inner peripheral surface 2e can be molded in the same shape, and hence the central axes of the inside diameter portions 2b, 2c and the inner peripheral surface 2e are coincident with each other. Accordingly, there might be no deviation between the optical axes of the lenses 3, 4 held by the lens frame 20.

The recessed portions 11 described above are formed in three positions along the inside diameter portion 2b of the lens frame 20, in the radial direction. Wall portions 11a, 11a of the recessed portion 11 on both sides in the peripheral direction regulate a motion of the steel ball 10 in the peripheral direction. Further, a motion of the steel ball in the radial direction is regulated by the inner peripheral surface 2e defined as the bottom portion of the recessed portion 11 in cooperation with a securing function based on a difference in terms of the curvature radius between the curved surfaces of the lenses 3, 4 described above.

With such a construction, the steel balls 10 are fitted in the recessed portions 11 including the inner peripheral surface 2e forming the same peripheral surface in the lens frame and thus positioned on the same circumference. These steel balls 10 are thereby capable of keeping the surfaces contiguous to the curved surface of the lens 3 in a non-tilted sate.

Moreover, the steel balls 10 fitted in such recessed portions 11 are disposed, with their motions being regulated, in the substantially trisected positions in the peripheral direction between the lenses 3, 4 as well as in the positions as close to the outer peripheral edges as possible. The lenses 3, 4 can be thereby provided in the lens frame 20 so that the spacing therebetween can be kept falling within a predetermined error range on the order of several μm.

It is because there can be generally commercially available the steel ball exhibiting a scatter in dimension of the outside diameter of the steel ball 10, which scatter falls within a range of several μm.

Note that this embodiment has been explained by exemplifying the combination of the convex and concave surfaces, facing to each other, of the lenses 3, 4. The present invention is not, however, limited to this combination, and can be used for securing a lens spacing with a convex-convex combination of the lens surfaces. In this case, there may be selected the steel ball 10 having a large dimension of the outside diameter corresponding to the curvature radius of the lens curved surface.

Figure 3:
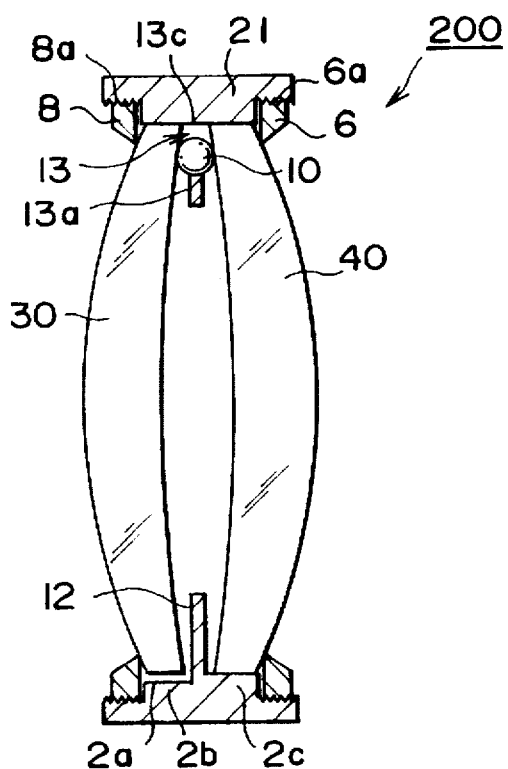
FIG. 3 is a sectional view showing the principal portion of the lens assembly body in another embodiment of the lens barrel according to the present invention.
Figure 4:
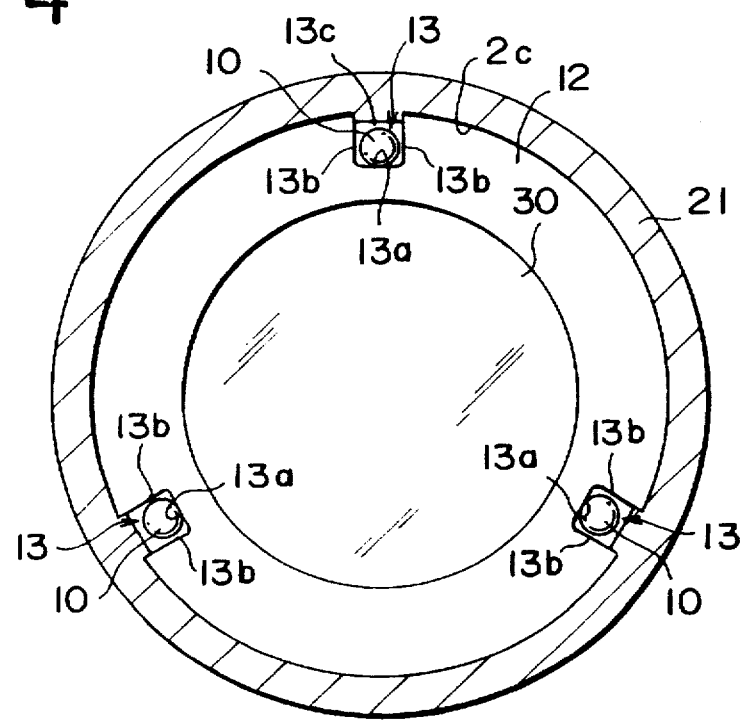
FIG. 4 is an explanatory sectional view showing the portions where the steel balls are incorporated in the lens assembly body in FIG. 3.

FIGS. 3 and 4 show a second embodiment of the lens barrel according to the present invention. In accordance with the second embodiment, the lens spacing is determined using the steel balls 10 in a case where lenses 30, 40 held in a lens frame 21 have concave lens surfaces facing to each other.

Herein, the lens frame 21 is formed with an inside diameter portion 2b accommodating the lens 30, and an inside diameter portion 2c accommodating the lens 40. These lenses 30, 40 are incorporated from both sides of the lens frame 21 in the Figures, and so held as to be secured by stop rings 8, 6.

In the thus constructed lens frame 21, an inward flange wall 12 is formed at the central portion in the optical-axis direction in such a region that effective light beams through the lenses 30, 40 are not intercepted. Holding holes 13, into which the steel balls are fitted as illustrated in FIG. 4, are formed in the substantially trisected positions in the peripheral direction of the inward flange wall 12. Then, these steel balls 10 contact with a concavely curved surface of the lens 30 and a concavely curved surface of the lens 40, and are thereby so disposed as to be interposed between these lenses 30, 40, thus determining a spacing between the lenses 30, 40.

These lenses 30, 40 have the concave lens surfaces facing to each other and therefore have their spacing becoming wider as it gets closer to the optical axis. However, the motion of the steel ball 10 toward the optical axis is regulated by an inner peripheral side edge of the holding hole 13 in the inward flange wall 12, thereby keeping the position of the disposition. This inner peripheral side edge 13a is formed in the same shape as an inner wall 13c through which the lenses 30, 40 are secured to the lens frame 21, and hence the central axes of the inner peripheral side edge 13a and the inner wall 13c are coincident with each other. The steel balls 10 are thereby held in such a state as to be positioned on the same circumference within the three holding holes 13 in the flange wall 12 of the lens frame 21. The steel balls 10 are thus in contact with the lens curved surfaces of the lenses 30, 40 and regulate these lens curved surfaces in the non-tilted state. A spacing is provided with respect to the inner peripheral surface 21a with which the lenses 30, 40 do not contact because of a deviation being produced at the die matching due to a difference between dies when manufactured. Further, the motion of the steel ball 10 in the peripheral direction is regulated by wall portions 13b, 13b positioned on both side in the peripheral direction within the holding hole 13.

In this embodiment, there is no restraints in terms of the spacing between the lenses and the curvature radiuses of the curved surfaces of the two face-to-face lenses 30, 40.

Note that the present invention is not limited to the structures explained in the embodiments discussed above, and the configurations and structures of the respective portions may be properly modified and changed. The present invention is not confined to the structures of the lens assembly bodies 100, 200 consisting of the lenses 3, 4, 30, 40 and the lens frames 20, 21 incorporating these lenses in the embodiments discussed above. There may be, however, considered a variety of modifications of the configuration and the structure of the lens frame, the number of lenses held by the lens frame, and the incorporating structure as well.

Moreover, the present invention has exemplified the curved surfaces, assuming the face-to-face relationship, of the lenses 3, 4, 30, 40 into which the above-described steel balls 10 are interposed, but is not limited to this configuration.

Further, the lens barrel using such lens assembly bodies 100, 200 may be the one provided integrally with the camera or an interchangeable type lens barrel detachably attachable to the camera. In addition, the steel ball is used as a spherical member in the embodiments. The present invention is not, however, confined to this, and the materials thereof are of no importance on condition that the spherical member is hard to deform and can make the error of the lens spacing accuracy several μm or under. For the time being, however, the steel balls for holding the lenses inside the lens frame at the predetermined intervals undergo such non-reflective treatments that the outer periphery of the spherical surface is blackened, matted and so on.

As discussed above, the lens barrel in accordance with the above embodiments includes the plurality of lenses, and the lens frame for holding these lenses at the predetermined intervals so as to make the optical axes of the lenses coincident with each other, wherein at least three steel balls are so disposed as to be in contact with the lens surfaces, facing to each other, of at least two lenses among those lenses. The construction is simple, nevertheless it is therefore feasible to restrain the error of the precision of the spacing between the lenses held within the lens frame, down to several μm or under. This makes it possible to obtain the lens barrel, wherein the lens units constituting the photographing optical system are assembled in the predetermined state.

That is, according to the embodiments given above, at least three pieces of commercially available steel balls capable of securing the accuracy of the dimension of the outside diameter to some extent, are used in place of the conventional the space ring in order to hold the predetermined spacing between the lenses within the lens frame. These steel balls are disposed in the substantially trisected positions in the peripheral direction of the lens, whereby the assembly can be made by setting the inter-lens spacing several μm or under, depending on the diametrical dimension of the steel ball.

It is apparent that, in this invention, a wide range of different working modes can be formed based on the invention without deviating from the spirit and scope of the invention. This invention is not restricted by its specific working modes except being limited by the appended claims.

What is claimed is:

1. A lens barrel comprising:
   at least two lenses;
   a lens holding member for holding the at least two lenses at predetermined intervals making optical axes of each of the lenses coincident with each other; and
   at least three spherical members disposed between two lenses and in contact with lens surfaces of the two lenses that face each other.

2. The lens barrel according to claim 1, wherein the at least three spherical members are steel balls.

3. The lens barrel according to claim 1, wherein the at least three spherical members are disposed so that centers of the at least three spherical members are positioned on a same circumference about the optical axes.

4. The lens barrel according to claim 1, wherein recess portions for holding the at least three spherical members are provided in the lens holding member.

5. The lens barrel according to claim 4, wherein the recess portions regulate movements of the at least three spherical members in circumferential and radial directions.

6. The lens barrel according to claim 4, wherein a spacing between the lens surfaces becomes narrower closer to the optical axes, and the recess portions regulate the movement of the at least three spherical members so as to recede from the optical axes.

7. The lens barrel according to claim 4, wherein a spacing between the lens surfaces becomes wider approaching the optical axes, and the recess portions regulate the movement of the at least three spherical members so as to approach the optical axes.

* * * * *